United States Patent

Benjamin et al.

[11] Patent Number: 5,460,489
[45] Date of Patent: Oct. 24, 1995

[54] TURBINE BLADE DAMPER AND SEAL

[75] Inventors: Robert B. Benjamin, Windsor, Conn.; Betsy B. Adams, Cambridge, Mass.

[73] Assignee: United Technologies Corporation, Hartford, Conn.

[21] Appl. No.: 226,518

[22] Filed: Apr. 12, 1994

[51] Int. Cl.[6] .................................................. F01D 5/10
[52] U.S. Cl. ..................................... 416/248; 416/500
[58] Field of Search .................................. 416/248, 500

[56] References Cited

U.S. PATENT DOCUMENTS

| | | | |
|---|---|---|---|
| 4,101,245 | 7/1978 | Hess et al. | 416/190 |
| 4,455,122 | 6/1984 | Schwarzmann et al. | 416/190 |
| 5,281,097 | 1/1994 | Wilson et al. | 416/193 |

FOREIGN PATENT DOCUMENTS 0437977  7/1991  European Pat. Off. .

Primary Examiner—John T. Kwon
Attorney, Agent, or Firm—Edward L. Kochey, Jr.

[57] ABSTRACT

A flexible seal (26) is located beneath blade platform (14) with end seals (28) in contact with adjacent platforms. A friction damper (34) formed of a flat slug of metal is supported only by the flexible seal (26) and in particular by the center section (32) of the seal.

2 Claims, 1 Drawing Sheet

TURBINE BLADE DAMPER AND SEAL

TECHNICAL FIELD

The invention relates to gas turbine engines and in particular to damping of blades and sealing the interstices between adjacent blades.

BACKGROUND OF THE INVENTION

A typical gas turbine assembly has a plurality of rotor blades extending radially out from a turbine disk. These blades extend into the gas flow path. Each airfoil has a root supporting it from the disk. This is a fir tree or dovetail engagement with the disk.

The blade experiences periodic loading during rotation of the turbine rotor. This leads to blade deflection and vibration. As the frequency approaches the resonant frequency of the blade the deflection amplitude can increase to extreme limits. This produces high cyclical stresses in the blades. It is quite desirable to dampen the vibration to avoid high stress.

Each blade is independently installed along with its blade platform and the disk. Axially extending gaps exist between the platforms. Gas passing through this gap bypasses the blade resulting in a power loss, and also overheating of the support structure. Of course it is desirable to minimize such bypass.

Weight is also important in an aircraft gas turbine engine. This is particularly the case in a rotating part where the higher centrifugal force of the increased weight sets a requirement for heavier and stronger rotor disk.

It is therefore an object to dampen vibration and to seal leakage with a minimum weight friction damper. Centrifugal force acting on the damper weight establishes the load against the platforms which establishes the resisting friction force. The farther from the blade support the damper is, the higher not only the centrifugal force, but the greater the movement of the blade at the damper location. The damper is therefore more effective at this radially outward location.

The dampers are more effective if they are stiff in the circumferential direction. With the minscular movement occurring to dampen the friction, even slight differences such as changes in the cross sectional area of the damper are significant changes in stiffness.

Separate supports for the seal and damper would add weight with no damping or sealing benefit. The seal should be thin and conformable with the surface with the seal most needed in the high pressure difference areas.

SUMMARY OF THE INVENTION

A gas turbine rotor seal arrangement includes a rotor disk with a plurality of circumferentially spaced turbine blades secured to the disk. Each blade has an axially and circumferentially extending blade platform.

Each blade platform has an underside. This blade underside is comprised of an axially extending middle portion fared into two substantially radially extending end portions. These extend at angles of less than 90° with respect to the middle portion so that a seal located thereunder will be pressed into contact with this surface by centrifugal force.

A flexible seal of a thin metallic strip has end seals conforming to the end portions. It has a center section joining the end seals and is located beneath and with the end seals in contact with two adjacent platforms.

Circumferentially extending radial supports on each blade are in contact with and radially support the seal from radially inward movement. A friction damper formed of a flat slug of material in contact with the middle portion of the underside of adjacent blades is radially supported only by the flexible seal.

A portion just inboard of the end portions of the flexible seals extends radially outward of the center portion. It thereby forms two humps which axially entrap the damper.

DESCRIPTION OF THE PREFERRED EMBODIMENT

Figure 1:
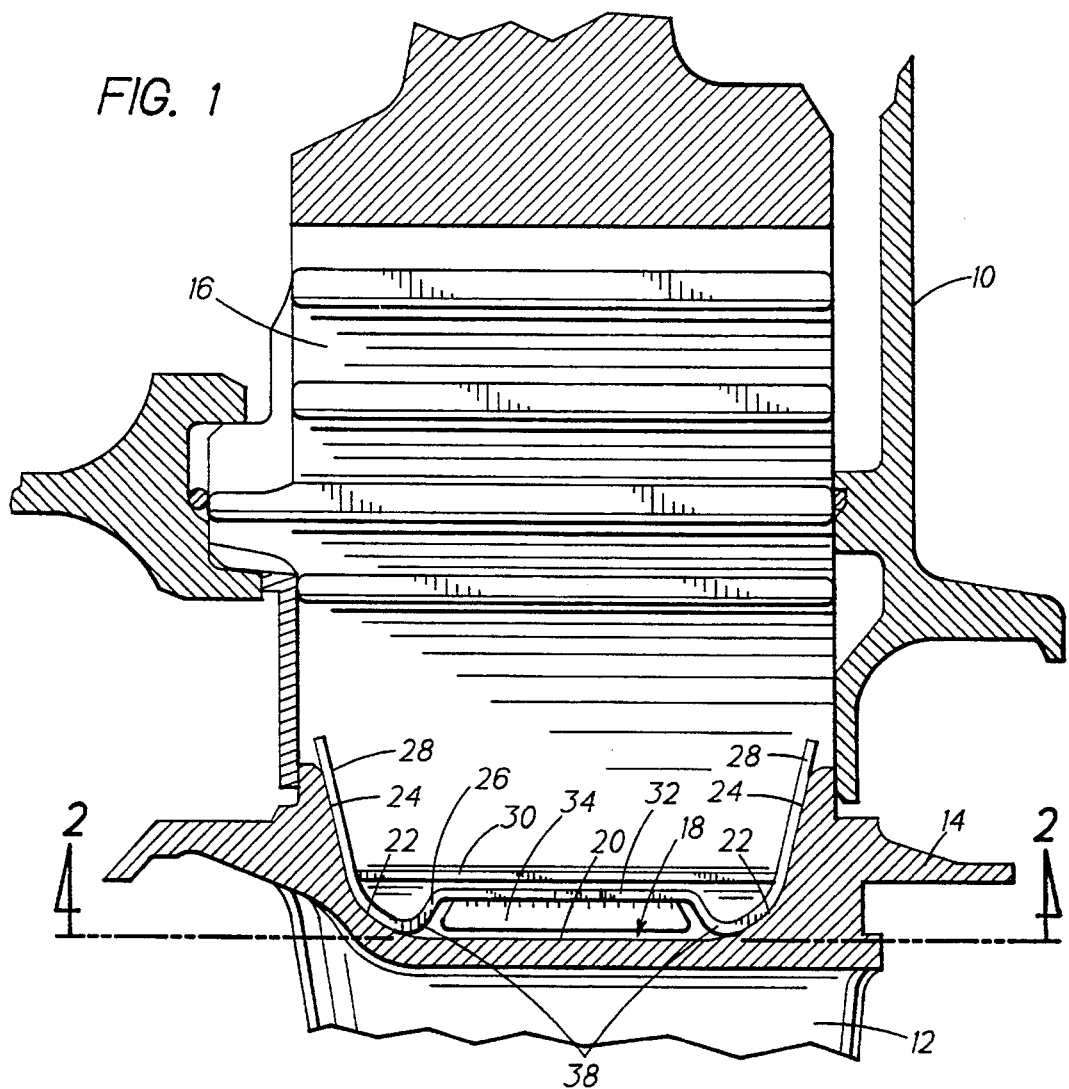
FIG. 1 is a sectional view taken in the circumferential direction.
Figure 2:
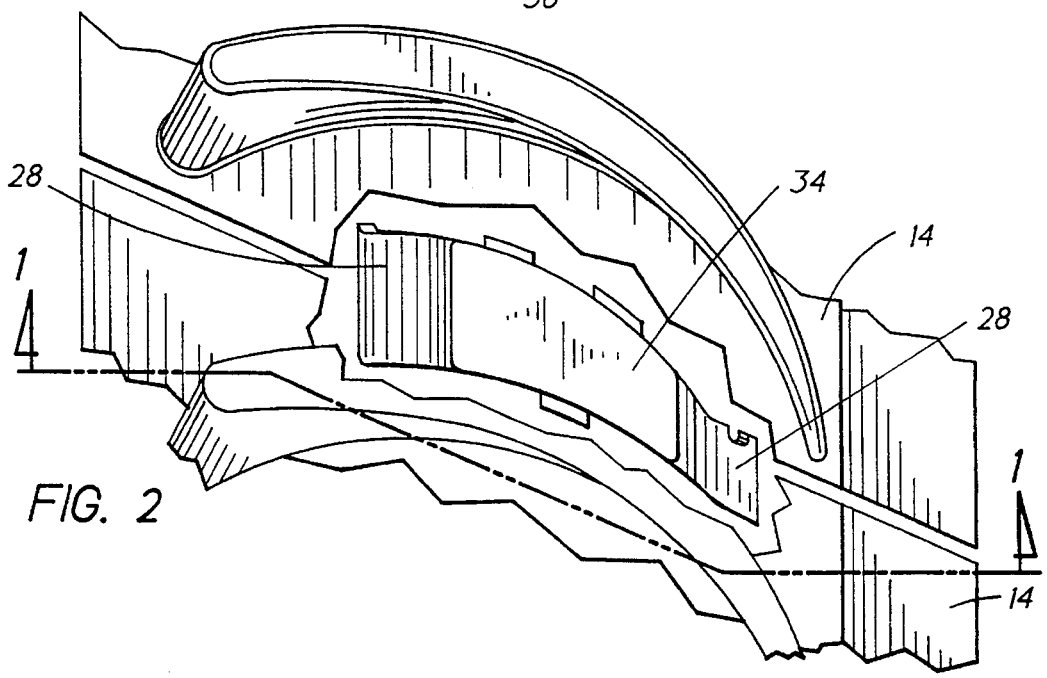
FIG. 2 is a sectional view taken in a the radial direction.

Referring to FIG. 1 a gas turbine rotor 10 carries a plurality of gas turbine blades 12. Each blade has a circumferentially and axially extending platform 14 and a root 16. The root is formed into a dovetail shape to support the blade from rotor 10.

Each blade platform 14 has an underside 18 comprised of a central portion 20 which fares in at bends 22 to the end portions 24. These end portions are substantially radial but at an angle less than 90° from the central portion 20.

A flexible seal 26 of a thin metallic strip is formed having end seals 28 conforming to the end portions 24 of the underside of the blade platform. Circumferential force acting on the seal increases the contact between the seal and the surfaces at these end locations. Since the maximum pressure difference is across the overall blade, this increases the sealing at the critical end areas.

A radial support 30 in the form of an axially and circumferentially extending ridge radially supports the flexible seal 26. Actually this support need not be a fully extending strip but could be formed of only a few protrusions.

The flexible seal 26 has a center section 32 which spaces the two end portions. Centrifugal action causes this center section to move outwardly thereby imposing axial forces outwardly against the two end portions.

A friction damper 34 formed of a flat slug of metal is in contact with the middle portion 20 of the underside of adjacent blades. This damper is supported only by the flexible seal, and in particular by the center section 32 of the flexible seal. No additional structure is required to support the damper and accordingly there is no additional weight for the support. This damper also is located at a radially outward location which is at the extreme radial position against the underside of the blade damper. It therefore experiences the maximum movement of the blades and is more effective.

For a given weight to damper exerts more force against the blades at this radially outward location and therefore can be a little lighter than it would be at an inboard location. Furthermore the seal 26 exerts some force against the damper increasing its effectiveness. Since the damper is supported on the seal, it need not extend from blade to blade a distance to pick up supports. Accordingly the weight can be placed within a damper slug which has a lesser circumferential dimension. The damper is therefore thicker in the radial direction. This means for a given weight the cross sectional area of the damper in the direction it receives forces (circumferentially) is greater. And follows that the damper is stiffer in this direction and the ultimate result is that a lighter damper may be used to achieve the same damping effect.

In this respect it is noted that only slight frictional movement occurs between adjacent blades. This movement can not occur until the blade platform starts slipping against the damper. Accordingly the slight movement which results in a strain only on the damper is not effective. Effective friction occurs only once the damper starts sliding, this being deterred by a flexible damper. The relative stiffness of the damper used here is therefore a benefit in saving of weight.

Humps 38 are formed near the end of each seal with these humps extending radially outward of the center portion. This entraps the damper 36 in the axial direction.

Accordingly a combination seal and damper is achieved which eliminates the need for a separate cast attachment feature such as a shelf for positioning the damper. The damper is also located against the underside of the platform which is the optimum position for the damper, this being the location of maximum blade to blade relative motion in board of the airfoil. The damper does not have to span the entire distance between adjacent airfoil since it is supported by the seal. Sealing is effectively achieved with the seal against the end portions of the underside of the blade where the pressure differences maximum. Some slight sealing is also achieved by the damper which is really too thick to conform to the surface. However the pressure differential at this location is minimal.

We claim:

1. A gas turbine engine rotor seal arrangement comprising:

a rotor disk;

a plurality of circumferentially spaced turbine blades secured to said disk, each blade having an axially and circumferentially extending blade platform having an underside comprised of an axially extending middle portion fared into two substantially radially extending end portions at angles less than 90° from said middle portion;

a flexible seal of a thin metallic strip having end seals conforming to said end portions, having a center section joining said end seals, said seal located beneath, between and in contact with two adjacent platforms;

a circumferentially extending radial support on each blade in contact with, and radially supporting said seal from radially inwardly movement;

a friction damper formed of a flat slug of metal in contact with said middle portion of the underside of adjacent blades and radially supported only by said flexible seal; and said flexible seal having the inside edge of each of said end portions extending radially outward of said center section forming two humps axially entrapping said damper.

2. A seal arrangement as in claim 1:

said radial support on each blade also axially extending.

* * * * *